United States Patent
Khlat

(10) Patent No.: US 12,456,957 B2
(45) Date of Patent: Oct. 28, 2025

(54) AMPLITUDE AND PHASE ERROR CORRECTION IN A WIRELESS COMMUNICATION CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 42 days.

(21) Appl. No.: 18/394,376

(22) Filed: Dec. 22, 2023

(65) Prior Publication Data

US 2024/0388270 A1    Nov. 21, 2024

Related U.S. Application Data

(60) Provisional application No. 63/466,801, filed on May 16, 2023, provisional application No. 63/480,785, filed on Jan. 20, 2023.

(51) Int. Cl.
*H04K 1/02* (2006.01)
*H03F 3/24* (2006.01)
(Continued)

(52) U.S. Cl.
CPC ........... *H03G 3/3042* (2013.01); *H03F 3/245* (2013.01); *H03G 5/165* (2013.01); *H03G 2201/103* (2013.01); *H03G 2201/307* (2013.01)

(58) Field of Classification Search
CPC ................. H03G 3/3042; H03G 5/165; H03G 2201/307; H03G 2201/103; H03F 3/245;
(Continued)

(56) References Cited

U.S. PATENT DOCUMENTS

| 4,797,898 A | 1/1989 | Martinez |
| 5,793,821 A | 8/1998 | Norrell et al. |

(Continued)

FOREIGN PATENT DOCUMENTS

| BR | 112015001348 A2 | 7/2017 |
| CN | 1151229 A | 6/1997 |

(Continued)

OTHER PUBLICATIONS

International Search Report and Written Opinion for International Patent Application No. PCT/US2022/043600, mailed Jan. 11, 2023, 15 pages.

(Continued)

*Primary Examiner* — Phuong Phu
(74) *Attorney, Agent, or Firm* — Withrow & Terranova, P.L.L.C.

(57) ABSTRACT

Amplitude and phase error correction in a transceiver circuit is provided. In embodiments disclosed herein, a transceiver circuit is configured to equalize an input vector to thereby correct amplitude-amplitude (AM-AM) and amplitude-phase (AM-PM) errors across a modulation bandwidth of the wireless communication circuit. Unlike conventional methods where complicated memory digital predistortion (mDPD) coefficients must be defined and calibrated for each modulation frequency within the modulation bandwidth, the transceiver circuit is configured herein to eliminate modulation frequency dependency of the AM-AM and AM-PM errors. As a result, it is possible to correct the AM-AM and AM-PM errors across the modulation bandwidth with reduced complexity to thereby improve efficiency and linearity of the wireless communication circuit.

20 Claims, 10 Drawing Sheets

(51) Int. Cl.
*H03G 3/30* (2006.01)
*H03G 5/16* (2006.01)
*H04L 25/03* (2006.01)
*H04L 25/49* (2006.01)

(58) Field of Classification Search
CPC ... H03F 1/3294; H03F 1/3247; H04L 27/366; H04L 25/03343; H04L 27/368; H04L 27/362; H04B 1/04
USPC ............... 375/296, 297, 220, 219, 229, 232
See application file for complete search history.

(56) References Cited

U.S. PATENT DOCUMENTS

| | | | |
|---|---|---|---|
| 6,166,601 A * | 12/2000 | Shalom | H03F 1/3247 330/149 |
| 6,275,685 B1 | 8/2001 | Wessel et al. | |
| 6,630,862 B1 | 10/2003 | Perthold et al. | |
| 6,760,451 B1 | 7/2004 | Craven et al. | |
| 6,806,767 B2 | 10/2004 | Dow | |
| 6,947,711 B1 | 9/2005 | Leyonhjelm | |
| 7,076,225 B2 | 7/2006 | Li et al. | |
| 7,170,342 B2 | 1/2007 | Suzuki et al. | |
| 7,430,248 B2 | 9/2008 | McCallister | |
| 7,522,658 B2 | 4/2009 | Jensen | |
| 7,583,754 B2 | 9/2009 | Liu | |
| 7,663,436 B2 | 2/2010 | Takano et al. | |
| 7,683,713 B2 | 3/2010 | Hongo | |
| 7,738,593 B2 | 6/2010 | Howard | |
| 7,755,429 B2 | 7/2010 | Nguyen et al. | |
| 7,831,221 B2 | 11/2010 | Leffel et al. | |
| 7,859,338 B2 | 12/2010 | Bajdechi et al. | |
| 7,889,820 B2 | 2/2011 | Murthy et al. | |
| 7,978,009 B2 | 7/2011 | Mu | |
| 8,493,141 B2 | 7/2013 | Khlat et al. | |
| 8,605,819 B2 | 12/2013 | Lozhkin | |
| 8,649,745 B2 | 2/2014 | Bai et al. | |
| 8,749,309 B2 | 6/2014 | Ho et al. | |
| 8,831,544 B2 | 9/2014 | Walker et al. | |
| 8,884,692 B2 | 11/2014 | Lee | |
| 9,001,947 B2 | 4/2015 | Wyville | |
| 9,036,734 B1 | 5/2015 | Mauer et al. | |
| 9,065,504 B2 | 6/2015 | Kwon et al. | |
| 9,112,413 B2 | 8/2015 | Barth et al. | |
| 9,356,760 B2 | 5/2016 | Larsson et al. | |
| 9,438,196 B2 | 9/2016 | Smith et al. | |
| 9,461,596 B1 | 10/2016 | Ozard | |
| 9,560,595 B2 | 1/2017 | Dakshinamurthy et al. | |
| 9,692,366 B2 | 6/2017 | Pilgram | |
| 9,705,477 B2 | 7/2017 | Velazquez | |
| 9,973,370 B1 | 5/2018 | Langer et al. | |
| 10,177,719 B2 | 1/2019 | Gazneli et al. | |
| 10,181,478 B2 | 1/2019 | Scott et al. | |
| 10,305,435 B1 | 5/2019 | Murugesu et al. | |
| 10,326,408 B2 | 6/2019 | Khlat et al. | |
| 10,361,744 B1 | 7/2019 | Khlat | |
| 10,432,145 B2 | 10/2019 | Khlat | |
| 10,476,437 B2 | 11/2019 | Nag et al. | |
| 10,778,345 B2 | 9/2020 | El-Hassan et al. | |
| 11,005,368 B2 | 5/2021 | Bansal et al. | |
| 11,088,660 B2 | 8/2021 | Lin et al. | |
| 11,387,789 B2 | 7/2022 | Khlat et al. | |
| 11,424,719 B2 | 8/2022 | Khlat | |
| 11,483,186 B2 | 10/2022 | Casper et al. | |
| 11,569,783 B2 | 1/2023 | Nomiyama et al. | |
| 11,637,531 B1 | 4/2023 | Perreault et al. | |
| 12,057,813 B2 * | 8/2024 | Khlat | H04L 25/03343 |
| 12,231,088 B2 * | 2/2025 | Khlat | H03F 3/245 |
| 2001/0022532 A1 * | 9/2001 | Dolman | H04L 27/368 330/149 |
| 2001/0054974 A1 | 12/2001 | Wright | |
| 2002/0190811 A1 | 12/2002 | Sperber | |
| 2003/0042979 A1 | 3/2003 | Gurvich et al. | |
| 2004/0239446 A1 | 12/2004 | Gurvich et al. | |
| 2004/0259509 A1 | 12/2004 | Duello et al. | |
| 2005/0100105 A1 | 5/2005 | Jensen | |
| 2005/0254659 A1 | 11/2005 | Heinsen | |
| 2006/0068710 A1 | 3/2006 | Jensen | |
| 2006/0209981 A1 | 9/2006 | Kluesing et al. | |
| 2006/0217083 A1 | 9/2006 | Braithwaite | |
| 2007/0032208 A1 | 2/2007 | Choi et al. | |
| 2008/0009258 A1 | 1/2008 | Safarian et al. | |
| 2008/0074209 A1 | 3/2008 | Ceylan et al. | |
| 2008/0161073 A1 | 7/2008 | Park et al. | |
| 2008/0246550 A1 | 10/2008 | Biedka et al. | |
| 2009/0004981 A1 | 1/2009 | Eliezer et al. | |
| 2009/0061787 A1 | 3/2009 | Koller et al. | |
| 2009/0074106 A1 * | 3/2009 | See | H04L 27/362 375/300 |
| 2009/0125264 A1 | 5/2009 | Betts et al. | |
| 2009/0141828 A1 | 6/2009 | Huang et al. | |
| 2009/0141830 A1 | 6/2009 | Ye | |
| 2009/0161793 A1 * | 6/2009 | Nentwig | H04L 27/366 375/297 |
| 2009/0232260 A1 | 9/2009 | Hayashi et al. | |
| 2009/0302945 A1 | 12/2009 | Catoiu et al. | |
| 2010/0135439 A1 | 6/2010 | Lackey | |
| 2010/0298030 A1 | 11/2010 | Howard | |
| 2011/0095826 A1 | 4/2011 | Hadjichristos et al. | |
| 2011/0182347 A1 | 7/2011 | Cheung | |
| 2011/0227767 A1 | 9/2011 | O'Brien | |
| 2012/0068748 A1 | 3/2012 | Stojanovic et al. | |
| 2012/0139635 A1 | 6/2012 | Ho et al. | |
| 2012/0189081 A1 | 7/2012 | Omoto et al. | |
| 2012/0244824 A1 | 9/2012 | Entezari et al. | |
| 2012/0256688 A1 | 10/2012 | Onishi | |
| 2013/0141062 A1 | 6/2013 | Khlat | |
| 2013/0214858 A1 | 8/2013 | Tournatory et al. | |
| 2013/0222057 A1 | 8/2013 | Henshaw | |
| 2013/0243129 A1 | 9/2013 | Okuni et al. | |
| 2014/0028368 A1 | 1/2014 | Khlat | |
| 2014/0029683 A1 | 1/2014 | Morris et al. | |
| 2014/0055199 A1 | 2/2014 | Takano et al. | |
| 2014/0062590 A1 | 3/2014 | Khlat et al. | |
| 2014/0062599 A1 | 3/2014 | Xu et al. | |
| 2014/0065989 A1 | 3/2014 | McLaurin | |
| 2014/0072307 A1 | 3/2014 | Zamani et al. | |
| 2014/0084996 A1 | 3/2014 | Schwent et al. | |
| 2014/0105264 A1 | 4/2014 | McLaurin et al. | |
| 2014/0184337 A1 | 7/2014 | Nobbe et al. | |
| 2014/0213196 A1 | 7/2014 | Langer et al. | |
| 2014/0232470 A1 | 8/2014 | Wilson | |
| 2014/0266432 A1 | 9/2014 | Scott et al. | |
| 2014/0315504 A1 | 10/2014 | Sakai et al. | |
| 2014/0361837 A1 | 12/2014 | Strange et al. | |
| 2015/0028946 A1 | 1/2015 | Al-Qaq et al. | |
| 2015/0126142 A1 | 5/2015 | Meredith | |
| 2015/0333781 A1 | 11/2015 | Alon et al. | |
| 2016/0173030 A1 | 6/2016 | Langer et al. | |
| 2016/0174293 A1 | 6/2016 | Mow et al. | |
| 2016/0182099 A1 | 6/2016 | Boddupally et al. | |
| 2016/0182100 A1 | 6/2016 | Menkhoff et al. | |
| 2016/0269210 A1 | 9/2016 | Kim et al. | |
| 2016/0301432 A1 | 10/2016 | Shizawa et al. | |
| 2016/0322992 A1 | 11/2016 | Okawa et al. | |
| 2017/0005676 A1 | 1/2017 | Yan et al. | |
| 2017/0104502 A1 | 4/2017 | Pratt | |
| 2017/0149457 A1 | 5/2017 | Mayer et al. | |
| 2017/0170838 A1 | 6/2017 | Pagnanelli | |
| 2017/0230924 A1 | 8/2017 | Wolberg et al. | |
| 2017/0338842 A1 * | 11/2017 | Pratt | H03F 1/3294 |
| 2017/0353197 A1 | 12/2017 | Ruffieux et al. | |
| 2018/0034418 A1 | 2/2018 | Blednov | |
| 2018/0175813 A1 | 6/2018 | Scott et al. | |
| 2018/0226923 A1 | 8/2018 | Nagamori | |
| 2018/0248570 A1 | 8/2018 | Camuffo | |
| 2019/0041890 A1 | 2/2019 | Chen et al. | |
| 2019/0058530 A1 | 2/2019 | Rainish et al. | |
| 2019/0068234 A1 | 2/2019 | Khlat et al. | |
| 2019/0097671 A1 | 3/2019 | Dimpflmaier et al. | |
| 2019/0238152 A1 | 8/2019 | Pagnanelli | |
| 2019/0245496 A1 | 8/2019 | Khlat et al. | |
| 2019/0296929 A1 | 9/2019 | Milicevic et al. | |

(56) References Cited

U.S. PATENT DOCUMENTS

| | | |
|---|---|---|
| 2019/0319583 A1 | 10/2019 | El-Hassan et al. |
| 2019/0356285 A1 | 11/2019 | Khlat et al. |
| 2020/0106392 A1 | 4/2020 | Khlat et al. |
| 2020/0119699 A1 | 4/2020 | Nishihara et al. |
| 2020/0136561 A1 | 4/2020 | Khlat et al. |
| 2020/0136563 A1 | 4/2020 | Khlat |
| 2020/0136568 A1 | 4/2020 | Hosoda et al. |
| 2020/0162030 A1 | 5/2020 | Drogi et al. |
| 2020/0204422 A1 | 6/2020 | Khlat |
| 2020/0259685 A1 | 8/2020 | Khlat |
| 2020/0295713 A1 | 9/2020 | Khlat |
| 2020/0336111 A1 | 10/2020 | Khlat |
| 2021/0058970 A1 | 2/2021 | Kwak et al. |
| 2021/0067097 A1 | 3/2021 | Wang et al. |
| 2021/0099136 A1 | 4/2021 | Drogi et al. |
| 2021/0143859 A1 | 5/2021 | Hageraats et al. |
| 2021/0194517 A1 | 6/2021 | Mirea et al. |
| 2021/0194740 A1 | 6/2021 | Aldana et al. |
| 2021/0281228 A1 | 9/2021 | Khlat |
| 2021/0399690 A1 | 12/2021 | Panseri et al. |
| 2022/0021348 A1 | 1/2022 | Philpott et al. |
| 2022/0216834 A1 | 7/2022 | Myoung et al. |
| 2022/0360229 A1 | 11/2022 | Khlat |
| 2022/0407462 A1 | 12/2022 | Khlat |
| 2022/0407463 A1 | 12/2022 | Khlat et al. |
| 2022/0407464 A1 | 12/2022 | Khlat et al. |
| 2022/0407465 A1 | 12/2022 | Khlat |
| 2022/0407478 A1 | 12/2022 | Khlat et al. |
| 2022/0416730 A1 | 12/2022 | Su et al. |
| 2023/0065760 A1 | 3/2023 | Hellberg |
| 2023/0079153 A1 | 3/2023 | Khlat |
| 2023/0080621 A1 | 3/2023 | Khlat |
| 2023/0080652 A1 | 3/2023 | Khlat et al. |
| 2023/0081095 A1 | 3/2023 | Khlat |
| 2023/0082145 A1 | 3/2023 | Lin et al. |
| 2023/0140184 A1 | 5/2023 | Zhu et al. |
| 2023/0155614 A1 | 5/2023 | Jelonnek et al. |
| 2023/0238927 A1 | 7/2023 | Kay et al. |
| 2023/0318537 A1 | 10/2023 | Scott et al. |
| 2023/0387859 A1 | 11/2023 | Drogi et al. |
| 2023/0387860 A1 | 11/2023 | Khlat et al. |
| 2023/0387861 A1 | 11/2023 | Maxim et al. |
| 2023/0421110 A1 | 12/2023 | Maxim et al. |
| 2023/0421111 A1 | 12/2023 | Khlat et al. |
| 2023/0421112 A1 | 12/2023 | Scott et al. |
| 2023/0421120 A1 | 12/2023 | Maxim et al. |
| 2024/0250704 A1* | 7/2024 | Khlat ............... H04B 1/04 |
| 2024/0372665 A1 | 11/2024 | Khoryaev et al. |
| 2024/0426954 A1 | 12/2024 | Guan et al. |

FOREIGN PATENT DOCUMENTS

| | | |
|---|---|---|
| CN | 1326321 C | 12/2001 |
| CN | 1550064 A | 11/2004 |
| CN | 1706096 A | 12/2005 |
| CN | 101036289 A | 9/2007 |
| CN | 101651459 A | 2/2010 |
| CN | 105812073 A | 7/2016 |
| CN | 107483021 A | 12/2017 |
| CN | 110798155 A | 2/2020 |
| CN | 110855251 A | 2/2020 |
| CN | 111064438 A | 4/2020 |
| CN | 210693998 U | 6/2020 |
| CN | 112995079 A | 6/2021 |
| CN | 113055324 A | 6/2021 |
| CN | 113659938 A | 11/2021 |
| CN | 113055324 B | 12/2021 |
| CN | 116015223 A | 4/2023 |
| CN | 113659938 B | 5/2023 |
| CN | 116794580 A | 9/2023 |
| CN | 117134711 A | 11/2023 |
| CN | 118117977 A | 5/2024 |
| CN | 118648236 A | 9/2024 |
| CN | 118872201 A | 10/2024 |
| CN | 118117977 B | 11/2024 |
| CN | 119072847 A | 12/2024 |
| CN | 119096468 A | 12/2024 |
| EP | 2705604 A2 | 3/2014 |
| EP | 2582041 B1 | 4/2018 |
| EP | 2232713 B1 | 10/2018 |
| EP | 3416340 A1 | 12/2018 |
| JP | 2011211533 A | 10/2011 |
| JP | 2015099972 A | 5/2015 |
| KR | 20110105319 A | 9/2011 |
| WO | 2007092794 A2 | 8/2007 |
| WO | 2010011551 A2 | 1/2010 |
| WO | 2010135711 A1 | 11/2010 |
| WO | 2012151594 A2 | 11/2012 |
| WO | 2014026178 A1 | 2/2014 |
| WO | 2021042088 A2 | 3/2021 |
| WO | 2023147211 A1 | 8/2023 |
| WO | 2023150539 A1 | 8/2023 |
| WO | 2023150545 A1 | 8/2023 |
| WO | 2023150587 A1 | 8/2023 |
| WO | 2023235070 A1 | 12/2023 |
| WO | 2023249771 A1 | 12/2023 |
| WO | 2023249889 A1 | 12/2023 |

OTHER PUBLICATIONS

Non-Final Office Action for U.S. Appl. No. 17/942,472, mailed Feb. 16, 2023, 13 pages.
Extended European Search Report for European Patent Application No. 22195382.1, mailed Feb. 1, 2023, 26 pages.
Extended European Search Report for European Patent Application No. 22195683.2, mailed Feb. 10, 2023, 12 pages.
Non-Final Office Action for U.S. Appl. No. 17/700,700, mailed Apr. 13, 2023, 11 pages.
Bai, W.-D. et al., "Principle of Vector Synthesis Predistortion Linearizers Controlling AM/AM and AM/PM Independently," 2016 IEEE International Conference on Ubiquitous Wireless Broadband (ICUWB), Oct. 16-19, 2016, Nanjing, China, IEEE, 3 pages.
Extended European Search Report for European Patent Application No. 22195695.6, mailed Feb. 14, 2023, 12 pages.
Extended European Search Report for European Patent Application No. 22196188.1, mailed Feb. 2, 2023, 25 pages.
International Search Report and Written Opinion for International Patent Application No. PCT/US2023/060303, mailed Apr. 11, 2023, 12 pages.
Final Office Action for U.S. Appl. No. 17/942,472, mailed Jul. 19, 2023, 16 pages.
Cho, M., "Analog Predistortion for Improvement of RF Power Amplifier Efficiency and Linearity," A Dissertation presented to the Academic Faculty in partial fulfillment of the requirements for the degree Doctor of Philosophy in the School of Electrical and Computer Engineering, Georgia Institute of Technology, Aug. 2016, available from the Internet: [URL: https://repository.gatech.edu/server/api/core/bitstreams/b8fe5cbb-e5db-4efe-b9a2-eaad5f671f14/content], 113 pages.
Kwak, T.-W et al., "A 2W CMOS Hybrid Switching Amplitude Modulator for EDGE Polar Transmitters," IEEE Journal of Solid-State Circuits, vol. 42, No. 12, Dec. 2007, IEEE, pp. 2666-2676.
Paek, J.-S. et al., "A-137 dBm/Hz Noise, 82% Efficiency AC-Coupled Hybrid Supply Modulator With Integrated Buck-Boost Converter," IEEE Journal of Solid-State Circuits, vol. 51, No. 11, Nov. 2016, IEEE pp. 2757-2768.
Paek, J.-S. et al., "Design of Boosted Supply Modulator With Reverse Current Protection for Wide Battery Range in Envelope Tracking Operation," IEEE Transactions on Microwave Theory and Techniques, vol. 67, No. 1, Jan. 2019, pp. 183-194.
Williams, P., "Crossover Filter Shape Comparisons," White Paper, Linea Research, Jul. 2013, 13 pages.
Non-Final Office Action for U.S. Appl. No. 17/700,685, mailed Dec. 22, 2023, 24 pages.
Non-Final Office Action for U.S. Appl. No. 17/689,232, mailed Dec. 11, 2023, 27 pages.
Non-Final Office Action for U.S. Appl. No. 17/737,300, mailed Aug. 28, 2023, 14 pages.

(56) References Cited

OTHER PUBLICATIONS

Notice of Allowance and Examiner-Initiated Interview Summary for U.S. Appl. No. 17/737,300, mailed Dec. 19, 2023, 12 pages.
Corrected Notice of Allowability for U.S. Appl. No. 17/737,300, mailed Dec. 27, 2023, 8 pages.
Advisory Action for U.S. Appl. No. 17/942,472, mailed Sep. 15, 2023, 3 pages.
Notice of Allowance for U.S. Appl. No. 17/942,472, mailed Oct. 18, 2023, 10 pages.
Corrected Notice of Allowability for U.S. Appl. No. 17/942,472, mailed Nov. 17, 2023, 6 pages.
Notice of Allowance for U.S. Appl. No. 17/700,700, mailed Oct. 23, 2023, 9 pages.
Supplemental Notice of Allowability for U.S. Appl. No. 17/700,700, mailed Nov. 8, 2023, 5 pages.
Non-Final Office Action for U.S. Appl. No. 17/939,350, mailed Jan. 17, 2024, 11 pages.
Extended European Search Report for European Patent Application No. 23153108.8, mailed Jun. 20, 2023, 18 pages.
Extended European Search Report for European Patent Application No. 23174010.1, mailed Oct. 10, 2023, 10 pages.
International Search Report and Written Opinion for International Patent Application No. PCT/US2023/019267, mailed Aug. 3, 2023, 14 pages.
Notice of Allowance for U.S. Appl. No. 17/700,685, mailed Apr. 5, 2024, 7 pages.
Final Office Action for U.S. Appl. No. 17/689,232, mailed Mar. 26, 2024, 28 pages.
Supplemental Notice of Allowability for U.S. Appl. No. 17/700,700, mailed Feb. 28, 2024, 5 pages.
Advisory Action U.S. Appl. No. 17/689,232, mailed May 23, 2024, 3 pages.
Non-Final Office Action for U.S. Appl. No. 17/689,232, mailed Jul. 17, 2024, 22 pages.
Final Office Action for U.S. Appl. No. 17/939,350, mailed May 21, 2024, 11 pages.
Non-Final Office Action for U.S. Appl. No. 17/700,826, mailed May 15, 2024, 28 pages.
International Search Report and Written Opinion for International Patent Application No. PCT/US2023/061734, mailed May 30, 2023, 15 pages.
International Search Report and Written Opinion for International Patent Application No. PCT/US2023/061741, mailed Jun. 1, 2023, 14 pages.
Invitation to Pay Additional Fees and Partial International Search for International Patent Application No. PCT/US2023/061804, mailed May 26, 2023, 10 pages.
International Search Report and Written Opinion for International Patent Application No. PCT/US2023/061804, mailed Jul. 17, 2023, 20 pages.
Hammi et al., "Temperature Compensated Digital Predistorter for 3G Power Amplifiers," Electronics, Circuit and Systems, 2005, Dec. 11, 2005, pp. 1-4.
Hao et al., "Hybrid Analog/Digital Linearization Based on Dual-Domain Decomposition of Nonlinearity," 2019 IEEE Asia-Pacific Microwave Conference, Dec. 10, 2019, pp. 156-158.
Lee et al., "Fully Automated Adaptive Analog Predistortion Power Amplifier in WCDMA Applications," 2005 European Microwave Conference CNIT La Defense, Paris, France, vol. 2, Oct. 4, 2005, pp. 967-970.
Li et al., "Analog Predistorter Averaged Digital Predistortion for Power Amplifiers in Hybrid Beam-Forming Multi-Input Multi-Output Transmitter," IEEE Access, vol. 8, Aug. 1, 2020, pp. 146145-146153.
Tome et al., "Hybrid Analog/Digital Linearizatio nof GaN HEMT-Based Power Amplifiers," IEEE Transactions on Microwave Theory and Techniques, vol. 67, No. 1, Jan. 1, 2019, pp. 288-294.
Notice of Allowance for U.S. Appl. No. 17/689,232, mailed Oct. 21, 2024, 10 pages.
Notice of Allowance for U.S. Appl. No. 17/714,244, mailed Sep. 16, 2024, 8 pages.
Non-Final Office Action for U.S. Appl. No. 17/939,350, mailed Sep. 6, 2024, 8 pages.
Non-Final Office Action for U.S. Appl. No. 17/890,538, mailed Oct. 21, 2024, 13 pages.
Notice of Allowance and Examiner-Initiated Interview Summary for U.S. Appl. No. 17/700,826, mailed Sep. 11, 2024, 10 pages.
International Search Report and Written Opinion for International Patent Application No. PCT/US2023/060803, mailed May 19, 2023, 13 pages.
International Search Report and Written Opinion for International Patent Application No. PCT/US2023/060804, mailed May 4, 2023, 19 pages.
International Search Report and Written Opinion for International Patent Application No. PCT/US2023/025512, mailed Sep. 28, 2023, 13 pages.
Fu, J.-S. et al., "Improving Power Amplifier Efficiency and Linearity Using a Dynamically Controlled Tunable Matching Network," IEEE Transactions on Microwave Theory and Techniques, vol. 56, No. 12, Dec. 2008, pp. 3239-3244.
Kim, S. et al., "A Tunable Power Amplifier Employing Digitally Controlled Accumulation-mode Varactor Array for 2.4-GHz Short-range Wireless Communication," 2016 IEEE Asia Pacific Conference on Circuits and Systems (APCCAS), Oct. 25-28, 2016, Jeju, Korea (South), IEEE, pp. 269-272.
Wang, T.-P., "A Fully Integrated W-Band Push-Push CMOS VCO With Low Phase Noise and Wide Tuning Range," IEEE Transactions on Ultrasonics, Ferroelectrics, and Frequency Control, vol. 58, No. 7, Jul. 2011, IEEE, pp. 1307-1319.
Wanner, R. et al., "Monolithically Integrated SiGe Push-Push Oscillators in the Frequency Range 50-190 GHz," 2006 IEEE Ninth International Symposium on Spread Spectrum Techniques and Applications, Aug. 28-31, 2006, Manaus, Brazil, IEEE, pp. 26-30.

\* cited by examiner

```
                    ┌─────────────────────────────────────────────────────────────────┐
                    │ APPLY A FREQUENCY EQUALIZATION FILTER (H_FEQ(s)) TO AN INPUT     │
                    │ VECTOR ($\vec{b}_{MOD}$) TO THEREBY GENERATE A FREQUENCY-       │
                    │ EQUALIZED INPUT VECTOR ($\vec{b}_{MOD-FE}$) HAVING A RESPECTIVE │
                    │ LINEARIZED GAIN ERROR AND A RESPECTIVE LINEARIZED PHASE ERROR   │
                    │ IN EACH OF A PLURALITY OF MODULATION FREQUENCIES ($f_1$-$f_N$)  │
                    │                             202                                 │
                    └─────────────────────────────────────────────────────────────────┘
                                                   │
                                                   ▼
                    ┌─────────────────────────────────────────────────────────────────┐
                    │ DETERMINE A LINEARIZED GAIN ERROR CORRECTION TERM ($\Delta$GAIN) │
                    │ IN A SELECTED MODULATION FREQUENCY ($f_{TGT}$) AMONG THE         │
                    │ PLURALITY OF MODULATION FREQUENCIES ($f_1$-$f_N$) BASED ON THE   │
                    │ RESPECTIVE LINEARIZED GAIN ERROR (L_GERR-fREF) IN A REFERENCE    │
                    │ MODULATION FREQUENCY (fREF) AMONG THE PLURALITY OF MODULATION    │
                    │ FREQUENCIES ($f_1$-$f_N$)                                        │
                    │                             204                                  │
                    └─────────────────────────────────────────────────────────────────┘
                                                   │
                                                   ▼
                    ┌─────────────────────────────────────────────────────────────────┐
                    │ DETERMINE A LINEARIZED PHASE ERROR CORRECTION TERM ($\Delta\phi$)│
                    │ IN THE SELECTED MODULATION FREQUENCY ($f_{TGT}$) BASED ON THE    │
                    │ RESPECTIVE LINEARIZED PHASE ERROR (L$\phi$ERR-fREF) IN THE       │
                    │ REFERENCE MODULATION FREQUENCY (fREF)                            │
                    │                             206                                  │
                    └─────────────────────────────────────────────────────────────────┘
                                                   │
                                                   ▼
                    ┌─────────────────────────────────────────────────────────────────┐
                    │ ADD THE LINEARIZED GAIN ERROR CORRECTION TERM ($\Delta$GAIN) AND │
                    │ THE LINEARIZED PHASE ERROR CORRECTION TERM ($\Delta\phi$) TO THE │
                    │ FREQUENCY-EQUALIZED INPUT VECTOR ($\vec{b}_{MOD-FE}$) TO THEREBY │
                    │ GENERATE AN AMPLITUDE-PHASE CORRECTED INPUT VECTOR               │
                    │ ($\vec{b}_{AMP-\phi--CRC}$) IN THE SELECTED MODULATION           │
                    │ FREQUENCY ($f_{TGT}$)                                            │
                    │                             208                                  │
                    └─────────────────────────────────────────────────────────────────┘
```

*FIG. 10*

AMPLITUDE AND PHASE ERROR CORRECTION IN A WIRELESS COMMUNICATION CIRCUIT

RELATED APPLICATIONS

This application claims the benefit of U.S. provisional patent application Ser. No. 63/480,785, filed on Jan. 20, 2023, and U.S. provisional patent application Ser. No. 63/466,801, filed on May 16, 2023, the disclosures of which are hereby incorporated herein by reference in their entireties.

FIELD OF THE DISCLOSURE

The technology of the disclosure relates generally to correcting amplitude-amplitude (AM-AM) and amplitude-phase (AM-PM) errors in a wireless communication circuit.

BACKGROUND

Mobile communication devices have become increasingly common in current society for providing wireless communication services. The prevalence of these mobile communication devices is driven in part by the many functions that are now enabled on such devices. Increased processing capability in such devices means that mobile communication devices have evolved from being pure communication tools into sophisticated mobile multimedia centers that enable enhanced user experiences.

The redefined user experience relies on higher data rates offered by advanced fifth generation (5G) and 5G new radio (5G-NR) technologies, which typically transmit and receive radio frequency (RF) signals in millimeter wave spectrums. Given that the RF signals are more susceptible to attenuation and interference in the millimeter wave spectrums, the RF signals are typically amplified by state-of-the-art power amplifiers to help boost the RF signals to a higher power before transmission.

In a typical wireless communication circuit, a transceiver circuit is configured to generate an RF signal, a power management circuit is configured to generate a modulated voltage, a power amplifier circuit is configured to amplify the RF signal based on the modulated voltage, and an antenna circuit is configured to transmit the RF signal in one or more transmission frequencies. The power amplifier circuit can be further coupled to the antenna circuit via an RF frontend circuit (e.g., filter, switches, etc.). Notably, an output reflection coefficient (e.g., $S_{22}$) of the power amplifier circuit can interact with an input reflection coefficient (e.g., $S_{11}$) of the RF frontend circuit to cause a group delay in the RF signal to potentially create amplitude-amplitude (AM-AM) and amplitude-phase (AM-PM) errors in the modulated voltage. As such, it is desirable to correct the AM-AM and the AM-PM errors in all of the transmission frequencies to help prevent undesired amplitude distortion, particularly when the RF signal is modulated across a wide modulation bandwidth (e.g., 200 MHz).

SUMMARY

Embodiments of the disclosure relate to amplitude and phase error correction in a wireless communication circuit. The wireless communication circuit includes a transceiver circuit, a power management integrated circuit (PMIC), and a power amplifier circuit(s). The transceiver circuit generates a radio frequency (RF) signal(s) from an input vector, the PMIC generates a modulated voltage, and the power amplifier circuit(s) amplifies the RF signal(s) based on the modulated voltage. When the power amplifier circuit(s) is coupled to an RF frontend circuit (e.g., filter/multiplexer), an output reflection coefficient (e.g., $S_{22}$) of the power amplifier circuit(s) can interact with an input reflection coefficient (e.g., $S_{11}$) of the RF frontend circuit to create a voltage distortion filter on an output stage of the power amplifier circuit(s), which can cause unwanted amplitude-amplitude (AM-AM) and amplitude-phase errors across a modulation bandwidth of the wireless communication circuit.

In this regard, in embodiments disclosed herein, the transceiver circuit is configured to equalize the input vector to thereby correct the AM-AM and AM-PM errors across the modulation bandwidth. Unlike conventional methods where complicated memory digital predistortion (mDPD) coefficients must be defined and calibrated for each modulation frequency within the modulation bandwidth, the transceiver circuit is configured herein to eliminate modulation frequency dependency of the AM-AM and AM-PM errors. As a result, it is possible to correct the AM-AM and AM-PM error across the modulation bandwidth with reduced complexity to thereby improve efficiency and linearity of the wireless communication circuit.

In one aspect, a transceiver circuit is provided. The transceiver circuit includes a frequency equalization circuit. The frequency equalization circuit is configured to apply a frequency equalization filter to an input vector to thereby generate a frequency-equalized input vector having a respective linearized gain error and a respective linearized phase error in each of multiple modulation frequencies. The transceiver circuit also includes a gain error correction circuit. The gain error correction circuit is configured to determine a linearized gain error correction term in a selected modulation frequency among the multiple modulation frequencies based on the respective linearized gain error in a reference modulation frequency among the multiple modulation frequencies. The transceiver circuit also includes a phase error correction circuit. The phase error correction circuit is configured to determine a linearized phase error correction term in the selected modulation frequency based on the respective linearized phase error in the reference modulation frequency. The transceiver circuit also includes an amplitude-phase correction circuit. The amplitude-phase correction circuit is configured to add the linearized gain error correction term and the linearized phase error correction term to the frequency-equalized input vector to thereby generate an amplitude-phase corrected input vector in the selected modulation frequency.

In another aspect, a wireless device is provided. The wireless device includes a transceiver circuit. The transceiver circuit includes a frequency equalization circuit. The frequency equalization circuit is configured to apply a frequency equalization filter to an input vector to thereby generate a frequency-equalized input vector having a respective linearized gain error and a respective linearized phase error in each of multiple modulation frequencies. The transceiver circuit also includes a gain error correction circuit. The gain error correction circuit is configured to determine a linearized gain error correction term in a selected modulation frequency among the multiple modulation frequencies based on the respective linearized gain error in a reference modulation frequency among the multiple modulation frequencies. The transceiver circuit also includes a phase error correction circuit. The phase error correction circuit is configured to determine a linearized phase error correction term in the selected modulation frequency based on the respective linearized phase error in the reference modulation frequency. The transceiver circuit also includes an amplitude-phase correction circuit. The amplitude-phase correction circuit is configured to add the linearized gain error correction term and the linearized phase error correction term to the frequency-equalized input vector to thereby generate an amplitude-phase corrected input vector in the selected modulation frequency.

In another aspect, a method for correcting amplitude and phase errors in a wireless communication circuit is provided. The method includes applying a frequency equalization filter to an input vector to thereby generate a frequency-equalized input vector having a respective linearized gain error and a respective linearized phase error in each of multiple modulation frequencies. The method also includes determining a linearized gain error correction term in a selected modulation frequency among the multiple modulation frequencies based on the respective linearized gain error in a reference modulation frequency among the multiple modulation frequencies. The method also includes determining a linearized phase error correction term in the selected modulation frequency based on the respective linearized phase error in the reference modulation frequency. The method also includes adding the linearized gain error correction term and the linearized phase error correction term to the frequency-equalized input vector to thereby generate an amplitude-phase corrected input vector in the selected modulation frequency.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 10 is a flowchart of an exemplary process for correcting amplitude and phase errors in a wireless communication circuit, such as the user element of FIG. 9.

DETAILED DESCRIPTION

Figure 1:
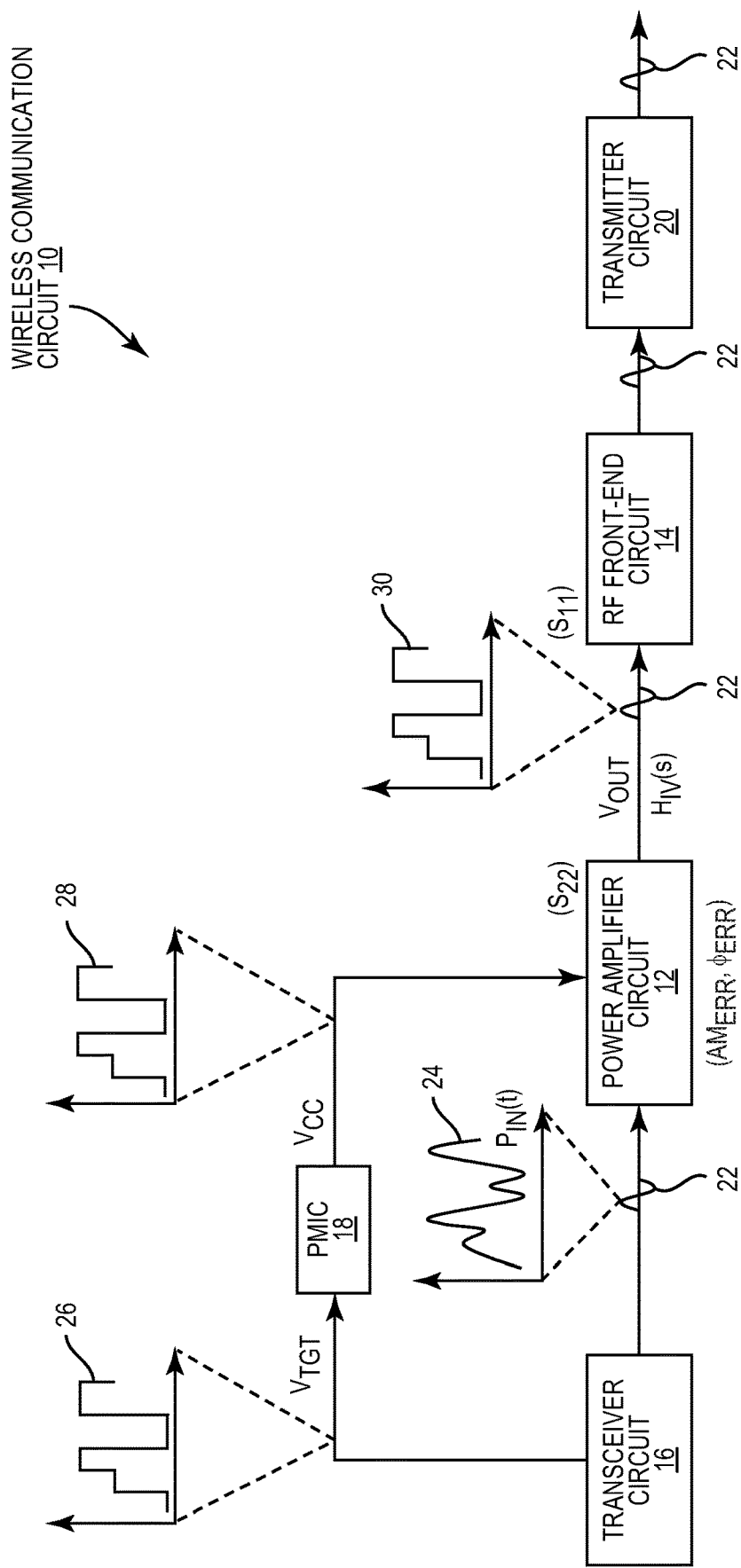
FIG. 1 is a schematic diagram of an exemplary wireless communication circuit, wherein an unwanted voltage distortion filter may cause amplitude-amplitude (AM-AM) and amplitude-phase (AM-PM) errors in a power amplifier circuit when the power amplifier circuit is coupled to a radio frequency (RF) frontend circuit.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to amplitude and phase error correction in a wireless communication circuit. The wireless communication circuit includes a transceiver circuit, a power management integrated circuit (PMIC), and a power amplifier circuit(s). The transceiver circuit generates a radio frequency (RF) signal(s) from an input vector, the PMIC generates a modulated voltage, and the power amplifier circuit(s) amplifies the RF signal(s) based on the modulated voltage. When the power amplifier circuit(s) is coupled to an RF frontend circuit (e.g., filter/multiplexer), an output reflection coefficient (e.g., $S_{22}$) of the power amplifier circuit(s) can interact with an input reflection coefficient (e.g., $S_{11}$) of the RF frontend circuit to create a voltage distortion filter on an output stage of the power amplifier circuit(s), which can cause unwanted amplitude-amplitude (AM-AM) and amplitude-phase errors across a modulation bandwidth of the wireless communication circuit.

In this regard, in embodiments disclosed herein, the transceiver circuit is configured to equalize the input vector to thereby correct the AM-AM and AM-PM errors across the modulation bandwidth. Unlike conventional methods where complicated memory digital predistortion (mDPD) coefficients must be defined and calibrated for each modulation frequency within the modulation bandwidth, the transceiver circuit is configured herein to eliminate modulation frequency dependency of the AM-AM and AM-PM errors. As a result, it is possible to correct the AM-AM and AM-PM errors across the modulation bandwidth with reduced complexity to thereby improve efficiency and linearity of the wireless communication circuit.

FIG. 1 is a schematic diagram of an exemplary wireless communication circuit 10 (e.g., a wireless device), wherein an unwanted voltage distortion filter $H_{IV}(s)$ may cause AM-AM and AM-PM errors in a power amplifier circuit 12 when the power amplifier circuit 12 is coupled to a radio frequency (RF) frontend circuit 14. Notably, in the unwanted voltage distortion filter $H_{IV}(s)$, "s" is a notation of Laplace transform. The wireless communication circuit 10 includes a transceiver circuit 16, a power management integrated circuit (PMIC) 18, and a transmitter circuit 20, which can include an antenna(s) (not shown) as an example.

The transceiver circuit 16 is configured to generate an RF signal 22 having a time-variant input power $P_{IN}(t)$ that corresponds to a time-variant voltage envelope 24 and provides the RF signal 22 to the power amplifier circuit 12. The transceiver circuit 16 is also configured to generate a time-variant target voltage VTGT, which is associated with a time-variant target voltage envelope 26 that tracks the time-variant voltage envelope 24 of the RF signal 22. The PMIC 18 is configured to generate a modulated voltage $V_{CC}$ having a time-variant modulated voltage envelope 28 that tracks the time-variant target voltage envelope 26 of the time-variant target voltage VTGT and provides the modulated voltage $V_{CC}$ to the power amplifier circuit 12. In context of the present disclosure, the modulated voltage $V_{CC}$ is an average power tracking (APT) voltage.

The power amplifier circuit 12 is configured to amplify the RF signal 22 based on the modulated voltage $V_{CC}$ to a time-variant output voltage VOUT associated with a time-variant output voltage envelope 30. The power amplifier circuit 12 then provides the amplified RF signal 22 to the RF frontend circuit 14. The RF frontend circuit 14 may be a filter circuit that performs further frequency filtering on the amplified RF signal 22 before providing the amplified RF signal 22 to the transmitter circuit 20 for transmission.

When the power amplifier circuit 12 is coupled to the RF frontend circuit 14, the unwanted voltage distortion filter $H_{IV}(s)$ can cause frequency-dependent AM-AM and AM-PM errors across all modulation frequencies across the modulation bandwidth. For a detailed analysis as to how the unwanted voltage distortion filter $H_{IV}(s)$ can be created by the coupling of the power amplifier circuit 12 and the RF frontend circuit 14, please refer to U.S. patent application Ser. No. 17/939,350, entitled "PHASE AND AMPLITUDE ERROR CORRECTION IN A TRANSMISSION CIRCUIT."

Figure 2:
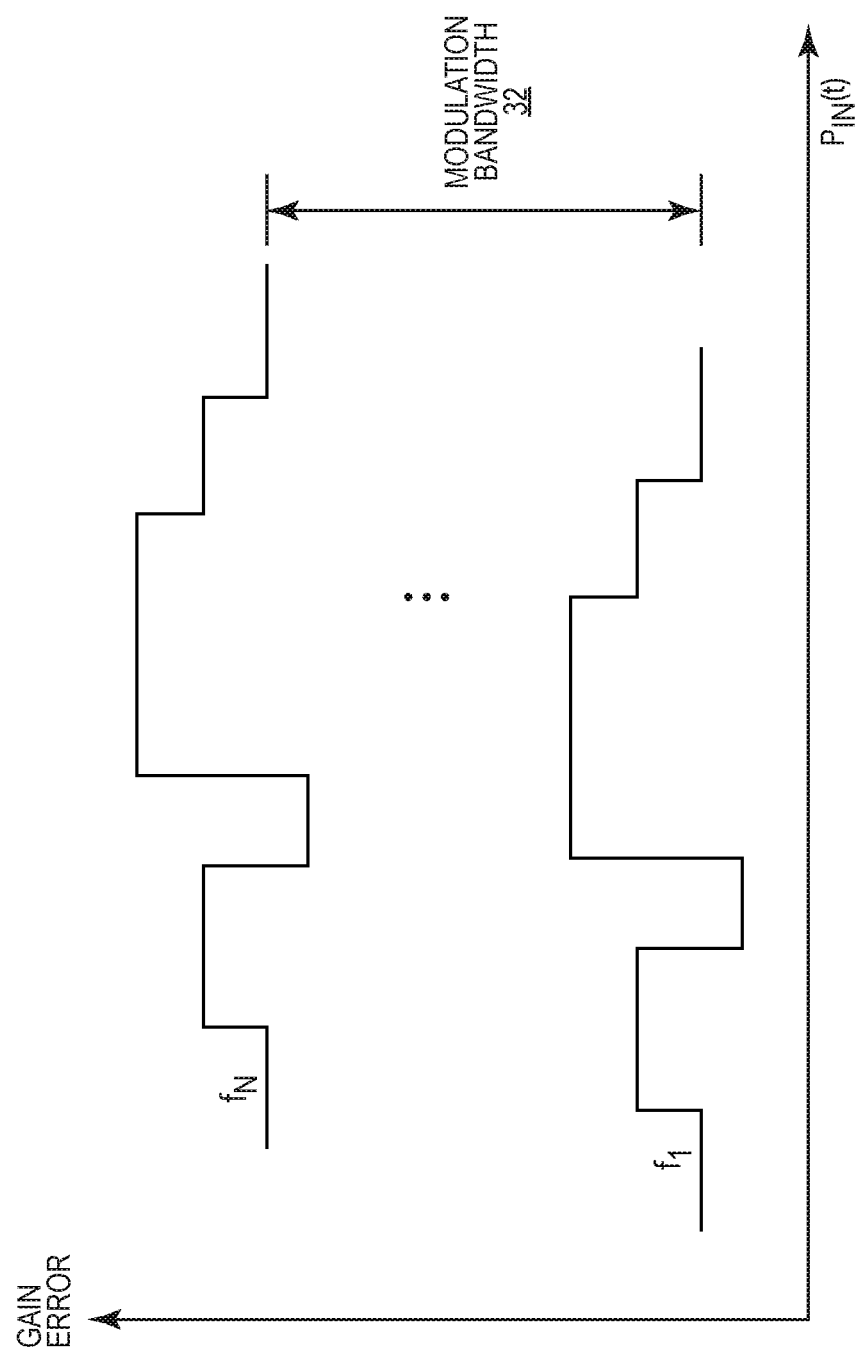
FIG. 2 is a graphic diagram illustrating a distribution of the AM-AM error across a modulation bandwidth of the wireless communication circuit of FIG. 1.

FIG. 2 is a graphic diagram illustrating a distribution of the AM-AM error across an entire modulation bandwidth 32 of the wireless communication circuit 10 of FIG. 1. The modulation bandwidth 32 includes multiple modulation frequencies $f_1$-$f_N$. Each of the modulation frequencies $f_1$-$f_N$ corresponds to a respective time-variant gain error that is dependent on the time-variant input power $P_{IN}(t)$. In other words, the gain error has a dependency on both the modulation frequencies $f_1$-$f_N$ and the time-variant input power $P_{IN}(t)$.

Figure 3:
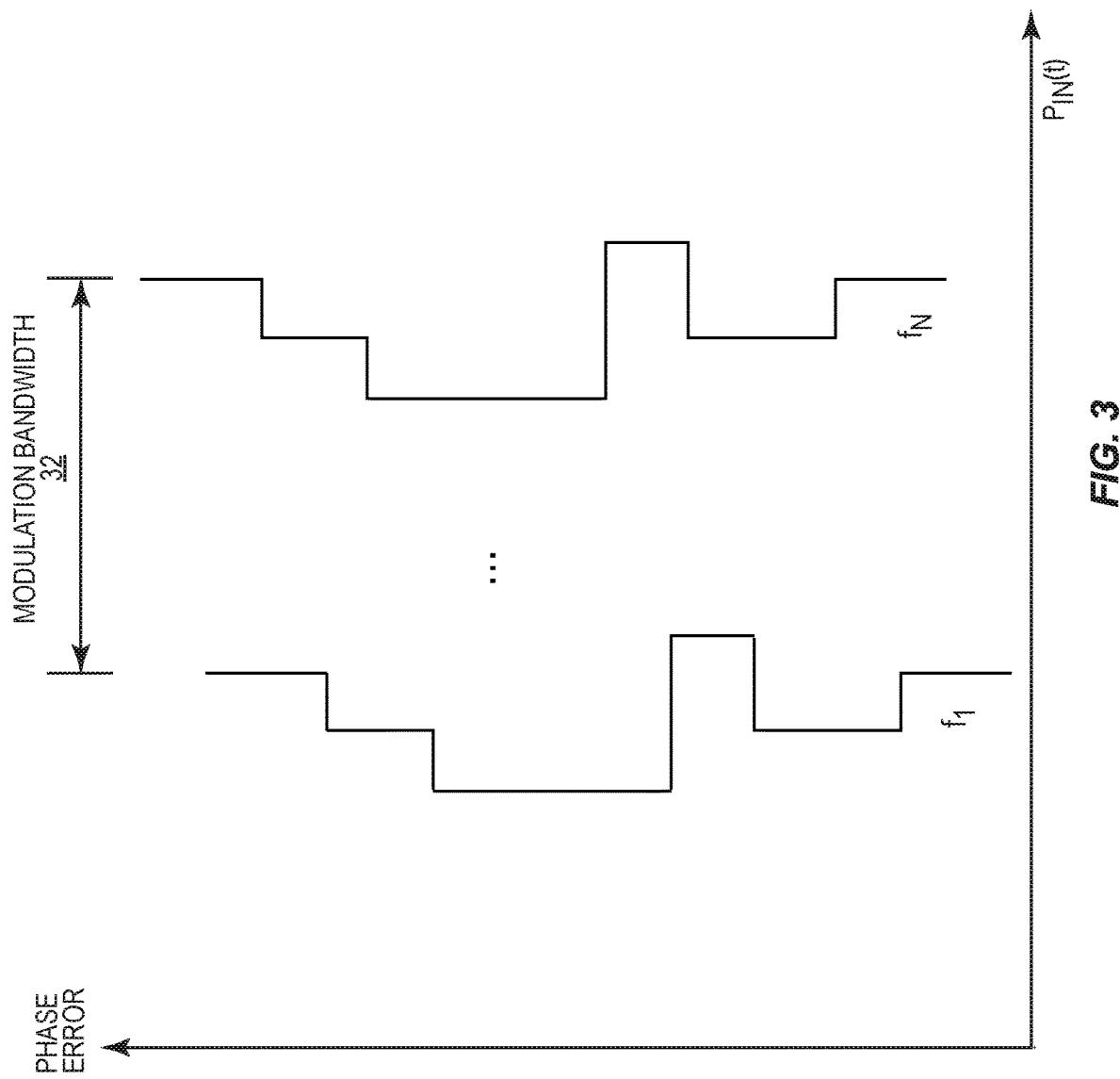
FIG. 3 is a graphic diagram illustrating a distribution of the AM-PM error across the modulation bandwidth of the wireless communication circuit of FIG. 1.

FIG. 3 is a graphic diagram illustrating a distribution of the AM-PM error across the entire modulation bandwidth 32 of the wireless communication circuit 10 of FIG. 1. The modulation bandwidth 32 includes multiple modulation frequencies $f_1$-$f_N$. Each of the modulation frequencies $f_1$-$f_N$ corresponds to a respective time-variant phase error that is dependent on the time-variant input power $P_{IN}(t)$. In other words, the phase error has a dependency on both the modulation frequencies $f_1$-$f_N$ and the time-variant input power $P_{IN}(t)$.

A conventional approach for correcting such gain and phase errors is to employ a memory digital predistortion (mDPD) circuit in the transceiver circuit 16 to inject a gain error correction term into the RF signal 22. However, given the frequency and power dependency of the gain error, the mDPD circuit must define and calibrate a respective set of complex coefficients for each of the modulation frequencies $f_1$-$f_N$. Notably, to operate in a fifth generation (5G) or a 5G new-radio (5G-NR) system, the wireless communication circuit 10 often needs to support a wide modulation bandwidth (e.g., >200 MHz). As such, a number of the modulation frequencies $f_1$-$f_N$ can increase significantly, thus leading to a significantly increased complexity with respect to implementation and calibration of the mDPD coefficients. Hence, it is desirable to enhance the wireless communication circuit 10 based on a low-complexity AM-AM and AM-PM error correction scheme to effectively correct the gain and phase errors across the entire modulation bandwidth 32.

Figure 4:
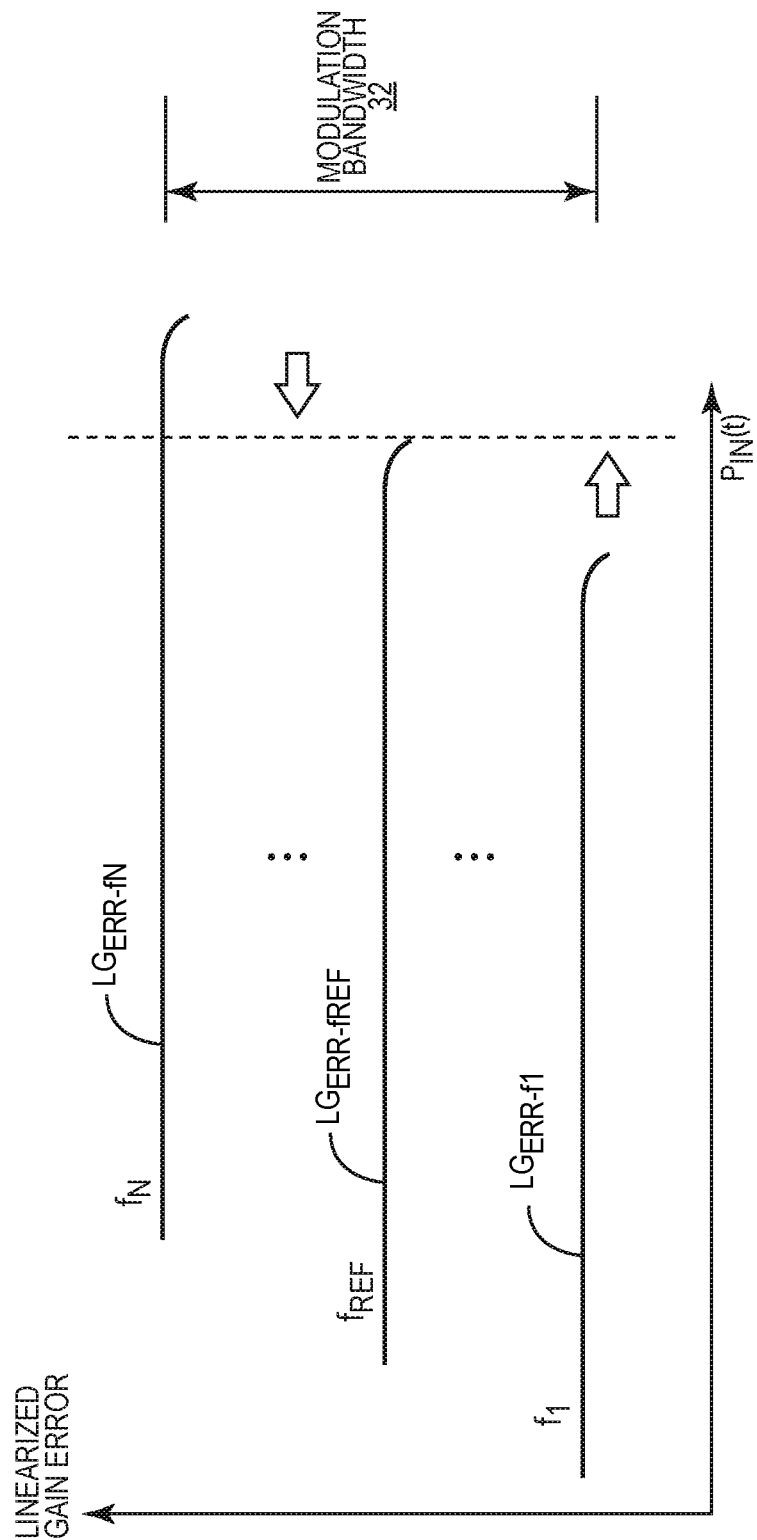
FIG. 4 is a graphic diagram illustrating a low-complexity AM-AM error correction scheme that can effectively correct the AM-AM error in the wireless communication circuit of FIG. 1.

FIG. 4 is a graphic diagram illustrating a low-complexity AM-AM error correction scheme that can effectively correct the AM-AM error in the wireless communication circuit 10 of FIG. 1. Herein, the low-complexity AM-AM correction scheme is able to reduce complexity associated with AM-AM error correction by eliminating modulation frequency dependency of the gain error.

First of all, the gain error associated with each of the modulation frequencies $f_1$-$f_N$ is linearized with respect to the time-variant input power $P_{IN}(t)$ to create a respective one of multiple linearized gain errors $LG_{ERR\text{-}f1}$-$LG_{ERR\text{-}fN}$. As shown in FIG. 4, the linearized gain errors $LG_{ERR\text{-}f1}$-$LG_{ERR\text{-}fN}$ associated with the modulation frequencies $f_1$-$f_N$ are independent from the time-variant input power $P_{IN}(t)$.

Next, a reference modulation frequency $f_{REF}$ among the modulation frequencies $f_1$-$f_N$ is chosen and a set of linearized gain error correction terms is defined for the reference modulation frequency $f_{REF}$. In a non-limiting example, the reference modulation frequency $f_{REF}$ can be a center modulation frequency among the modulation frequencies $f_1$-$f_N$.

Subsequently, a respective one of the linearized gain errors $LG_{ERR\text{-}f1}$-$LG_{ERR\text{-}fN}$ of any selected one of the modulation frequencies $f_1$-$f_N$ can be superimposed onto the respective linearized gain error $LG_{ERR\text{-}fREF}$ of the reference modulation frequency $f_{REF}$. Herein, the phrase "superimposing" refers to a process for determining an appropriate x-axis shift (e.g., a vector) to align the respective one of the linearized gain errors $LG_{ERR\text{-}f1}$-$LG_{ERR\text{-}fN}$ of any selected one of the modulation frequencies $f_1$-$f_N$ with the respective linearized gain error $LG_{ERR\text{-}fREF}$ of the reference modulation frequency $f_{REF}$.

As shown in FIG. 4, superimposing the linearized gain error $LG_{ERR\text{-}f1}$ of the modulation frequency $f_1$ onto the linearized gain error $LG_{ERR\text{-}fREF}$ of the reference modulation frequency $f_{REF}$ is equivalent to shifting the linearized gain error $LG_{ERR\text{-}f1}$ of the modulation frequency $f_1$ rightward along the x-axis. Likewise, superimposing the linearized gain error $LG_{ERR\text{-}fN}$ of the modulation frequency $f_N$ onto the linearized gain error $LG_{ERR\text{-}fREF}$ of the reference modulation frequency fREF is equivalent to shifting the linearized gain error $LG_{ERR\text{-}fN}$ of the modulation frequency $f_N$ leftward along the x-axis. By superimposing the respective one of the linearized gain errors $LG_{ERR\text{-}f1}$-$LG_{ERR\text{-}fN}$ of each of the modulation frequencies $f_1$-$f_N$ onto the linearized gain error $LG_{ERR\text{-}fREF}$ of the reference modulation frequency $f_{REF}$, it is possible to determine a respective linearized gain error correction term for each of the modulation frequencies $f_1$-$f_N$ based on the set of linearized gain error correction terms defined for the reference modulation frequency $f_{REF}$. In this regard, the complexity associated with AM-AM error correction only revolves around the reference modulation frequency $f_{REF}$, as opposed to having to involve all the modulation frequencies $f_1$-$f_N$. As a result, the low-complexity AM-AM error correction scheme is clearly advantageous over the conventional methods where complicated mDPD coefficients must be defined and calibrated for each of the modulation frequencies $f_1$-$f_N$.

Figure 5:
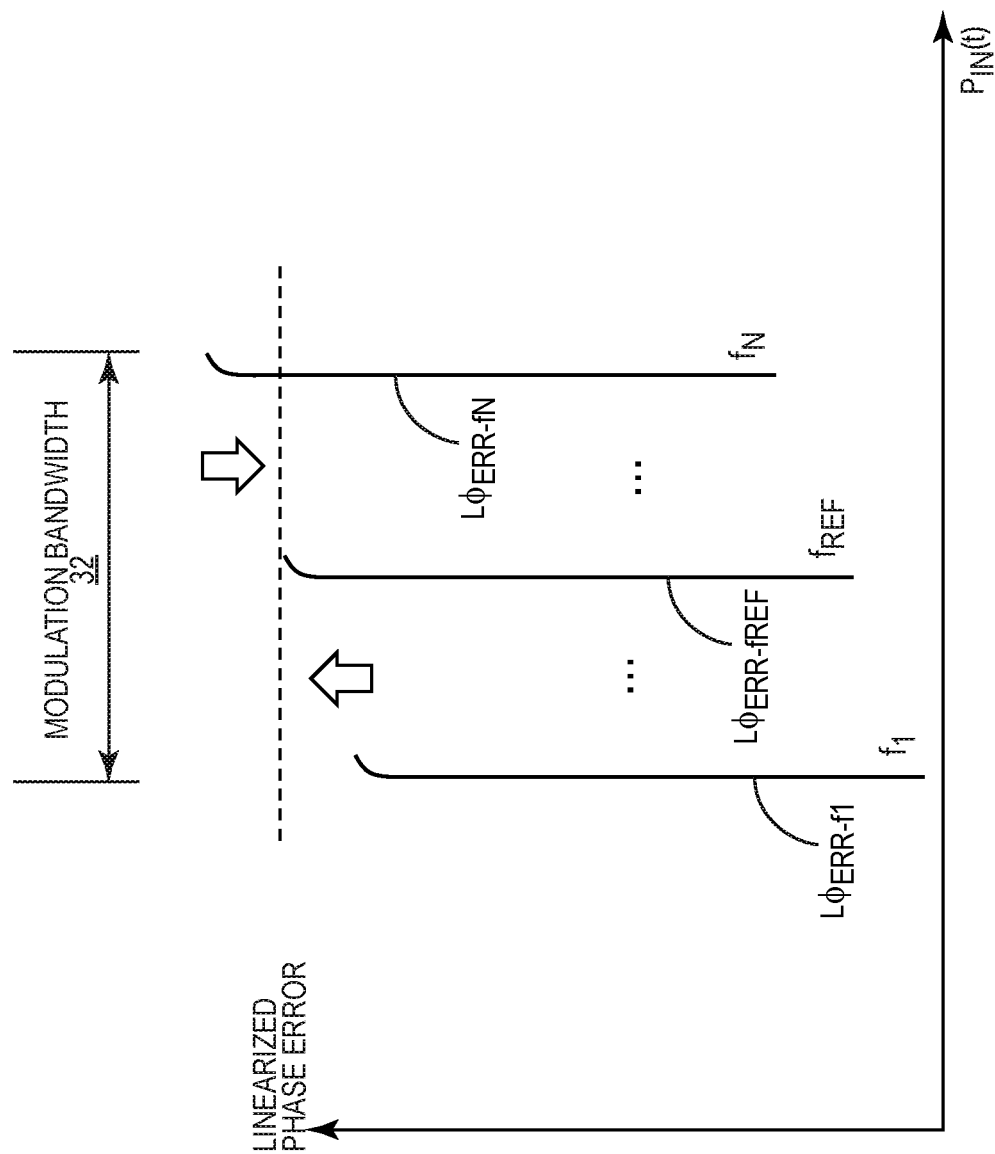
FIG. 5 is a graphic diagram illustrating a low-complexity AM-PM error correction scheme that can effectively correct the AM-PM error in the wireless communication circuit of FIG. 1.

FIG. 5 is a graphic diagram illustrating a low-complexity AM-PM error correction scheme that can effectively correct the AM-PM error in the wireless communication circuit 10 of FIG. 1. Herein, the low-complexity AM-PM correction scheme is able to reduce complexity associated with AM-PM error correction by eliminating modulation frequency dependency of the phase error.

First of all, the phase error associated with each of the modulation frequencies $f_1$-$f_N$ is linearized with respect to the time-variant input power $P_{IN}(t)$ to create a respective one of multiple linearized phase errors $L\phi_{ERR\text{-}f1}$-$L\phi_{ERR\text{-}fN}$. As shown in FIG. 5, the linearized phase errors $L\phi_{ERR\text{-}f1}$-$L\phi_{ERR\text{-}fN}$ associated with the modulation frequencies $f_1$-$f_N$ are independent from the time-variant input power $P_{IN}(t)$.

Next, a reference modulation frequency $f_{REF}$ among the modulation frequencies $f_1$-$f_N$ is chosen and a set of linearized phase error correction terms is defined for the reference modulation frequency $f_{REF}$. In a non-limiting example, the reference modulation frequency $f_{REF}$ can be a center modulation frequency among the modulation frequencies $f_1$-$f_N$.

Subsequently, a respective one of the linearized phase errors $L\phi_{ERR\text{-}f1}$-$L\phi_{ERR\text{-}fN}$ of any selected one of the modulation frequencies $f_1$-$f_N$ can be superimposed onto the respective linearized phase error $L\phi_{ERR\text{-}fREF}$ of the reference modulation frequency $f_{REF}$. Herein, the phrase "superimposing" refers to a process for determining an appropriate y-axis shift (e.g., a vector) to align the respective one of the linearized phase errors $L\phi_{ERR\text{-}f1}$-$L\phi_{ERR\text{-}fN}$ of any selected one of the modulation frequencies $f_1$-$f_N$ with the respective linearized phase error $L\phi_{ERR\text{-}fREF}$ of the reference modulation frequency $f_{REF}$.

As shown in FIG. 5, superimposing the linearized phase error $L\phi_{ERR\text{-}f1}$ of the modulation frequency $f_1$ onto the linearized phase error $L\phi_{ERR\text{-}fREF}$ of the reference modulation frequency $f_{REF}$ is equivalent to shifting the linearized phase error $L\phi_{ERR\text{-}f1}$ of the modulation frequency $f_1$ upward along the y-axis. Likewise, superimposing the linearized phase error $L\phi_{ERR\text{-}fN}$ of the modulation frequency $f_N$ onto the linearized phase error $L\phi_{ERR\text{-}fREF}$ of the reference modulation frequency fREF is equivalent to shifting the linearized phase error $L\phi_{ERR\text{-}fN}$ of the modulation frequency $f_N$ downward along the y-axis. By superimposing the respective one of the linearized phase errors $L\phi_{ERR\text{-}f1}$-$L\phi_{ERR\text{-}fN}$ of each of the modulation frequencies $f_1$-$f_N$ onto the linearized phase error $L\phi_{ERR\text{-}fREF}$ of the reference modulation frequency $f_{REF}$, it is possible to determine a respective linearized phase error correction term for each of the modulation frequencies $f_1$-$f_N$ based on the set of linearized phase error correction terms defined for the reference modulation frequency $f_{REF}$. In this regard, the complexity associated with AM-PM error correction only revolves around the reference modulation frequency $f_{REF}$, as opposed to having to involve all the modulation frequencies $f_1$-$f_N$. As a result, the low-complexity AM-PM error correction scheme is clearly advantageous over the conventional methods where complicated mDPD coefficients must be defined and calibrated for each of the modulation frequencies $f_1$-$f_N$.

Figure 6:
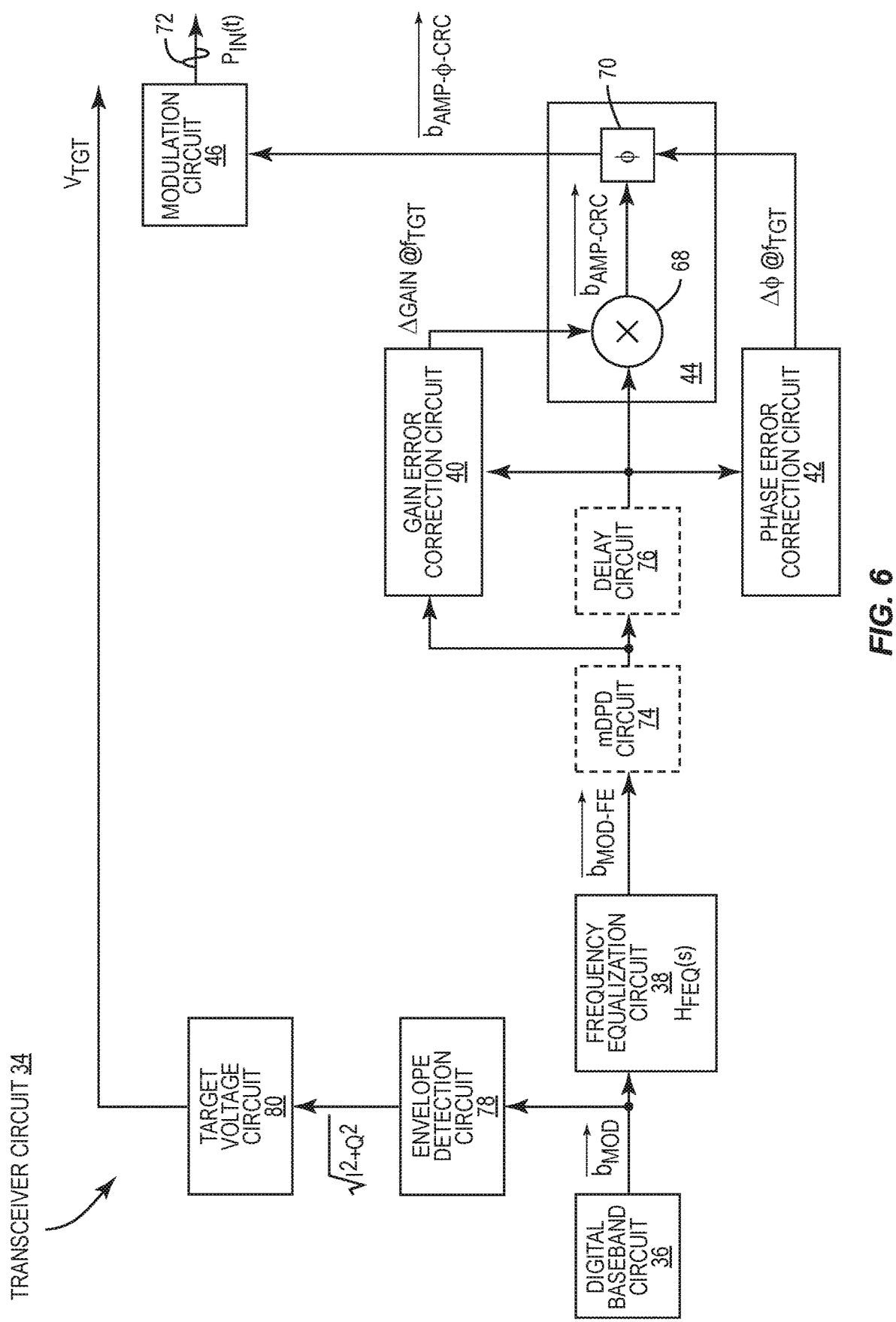
FIG. 6 is a schematic diagram of an exemplary transceiver circuit configured according to embodiments of the present disclosure to correct the AM-AM and AM-PM errors in the wireless communication circuit of FIG. 1 based on the low-complexity AM-AM error correction scheme illustrated in FIG. 4 and the low-complexity AM-PM error correction scheme illustrated in FIG. 5.

FIG. 6 is a schematic diagram of an exemplary transceiver circuit 34 configured according to embodiments of the present disclosure to correct the AM-AM and AM-PM errors in the wireless communication circuit 10 based on the low-complexity AM-AM error correction scheme in FIG. 4 and the low-complexity AM-PM error correction scheme in FIG. 5. In an embodiment, the transceiver circuit 34 can be provided in the wireless communication circuit 10 to replace the transceiver circuit 16. By replacing the transceiver circuit 16 with the transceiver circuit 34, the wireless communication circuit 10 can be adapted to support the low-complexity AM-AM and AM-PM error correction schemes of the present disclosure.

The transceiver circuit 34 includes a digital baseband circuit 36, a frequency equalization circuit 38, a gain error correction circuit 40, a phase error correction circuit 42, an amplitude-phase correction circuit 44, and a modulation circuit 46. The digital baseband circuit 36 is configured to generate an input vector $\overrightarrow{b_{MOD}}$ in a selected modulation frequency $f_{TGT}$ among the modulation frequencies $f_1$-$f_N$ across the modulation bandwidth 32 ($f_{TGT} \in (f_1\text{-}f_N)$).

The frequency equalization circuit 38 is configured to apply a frequency equalization filter $H_{FEQ}(S)$ to the input vector $\vec{b}_{MOD}$ to generate a frequency-equalized input vector $\vec{b}_{MOD\text{-}FE}$, in which each of the modulation frequencies $f_1$-$f_N$ is associated with a respective one of the linearized gain errors $LG_{ERR\text{-}f1}$-$LG_{ERR\text{-}fN}$ as illustrated in FIG. 4 and a respective one of the linearized phase errors $L\phi_{ERR\text{-}f1}$-$L\phi_{ERR\text{-}fN}$ as illustrated in FIG. 5. As previously illustrated in FIGS. 4 and 5, the linearized gain errors $LG_{ERR\text{-}f1}$-$LG_{ERR\text{-}fN}$ and the linearized phase errors $L\phi_{ERR\text{-}f1}$-$L\phi_{ERR\text{-}fN}$ are independent from the time-variant input power $P_{IN}(t)$ across the modulation frequencies $f_1$-$f_N$ in the modulation bandwidth 32.

The gain error correction circuit 40 is configured to determine a linearized gain error correction term $\Delta$Gain in the selected modulation frequency $f_{TGT}$ among the modulation frequencies $f_1$-$f_N$ based on the respective linearized gain error $LG_{ERR\text{-}fREF}$ ($LG_{ERR\text{-}fREF} \in (LG_{ERR\text{-}f1}\text{-}LG_{ERR\text{-}fN})$) in a reference modulation frequency $f_{REF}$ selected among the modulation frequencies $f_1$-$f_N$ (fREF E ($f_1$-$f_N$)). The phase error correction circuit 42 is configured to determine a linearized phase error correction term $\Delta\phi$ in the selected modulation frequency $f_{TGT}$ based on the respective linearized phase error $L\phi_{ERR\text{-}fREF}$ ($L\phi_{ERR\text{-}fREF} \in (L\phi_{ERR\text{-}f1}\text{-}L\phi_{ERR\text{-}fN})$) in the reference modulation frequency $f_{REF}$. The amplitude-phase correction circuit 44 is configured to add the linearized gain error correction term $\Delta$Gain and the linearized phase error correction term $\Delta\phi$ to the frequency-equalized input vector $\vec{b}_{MOD\text{-}FE}$ to thereby generate an amplitude-phase corrected input vector $\vec{b}_{AMP\text{-}\phi\text{-}CRC}$ in the selected modulation frequency $f_{TGT}$.

Figure 7:
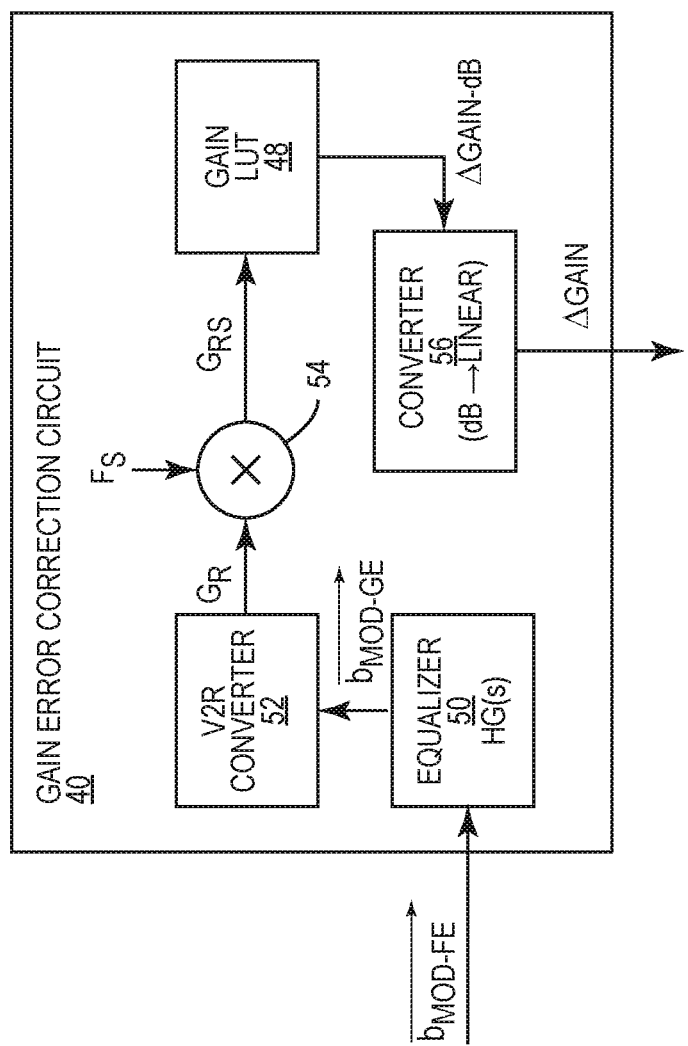
FIG. 7 is a schematic diagram of an exemplary gain error correction circuit in the transceiver circuit of FIG. 6.

FIG. 7 is a schematic diagram providing an exemplary illustration of the gain error correction circuit 40 in the transceiver circuit 34 of FIG. 6. Common elements between FIGS. 6 and 7 are shown therein with common element numbers and will not be re-described herein.

In an embodiment, the gain error correction circuit 40 includes a gain lookup table (LUT) circuit 48, which may be preprogrammed to store a set of decibel gain error correction terms $\Delta$Gain-dB associated with the reference modulation frequency $f_{REF}$. As previously described in FIG. 4, each of the modulation frequencies $f_1$-$f_N$ can be superimposed on the reference modulation frequency $f_{REF}$ by shifting a respective one of the modulation frequencies $f_1$-$f_N$ leftward or rightward. In this regard, in a non-limiting example, the gain LUT circuit 48 can be programmed to correlate different amounts of the leftward or rightward shift with different decibel gain error correction terms $\Delta$Gain-dB. As such, once the amount of the leftward or rightward shift associated with a respective one of the modulation frequencies $f_1$-$f_N$ is determined, the gain LUT circuit 48 will be able to provide a corresponding decibel gain error correction term $\Delta$Gain-dB for the respective one of the modulation frequencies $f_1$-$f_N$.

The gain error correction circuit 40 also includes a gain equalizer circuit 50, a gain vector-to-real (V2R) converter 52, a gain scaler 54 (e.g., a digital scaler), and a converter circuit 56. The gain equalizer circuit 50 is configured to apply a complex gain filter HG(s) to the frequency-equalized input vector $\vec{b}_{MOD\text{-}FE}$ to generate a gain-equalized input vector $\vec{b}_{MOD\text{-}GE}$ wherein the respective one of the linearized gain errors $LG_{ERR\text{-}f1}$-$LG_{ERR\text{-}fN}$ in the selected one of the modulation frequencies $f_1$-$f_N$ is superimposed onto the respective linearized gain error $LG_{ERR\text{-}fREF}$ in the reference modulation frequency $f_{REF}$.

The gain V2R converter 52 is configured to extract a real gain parameter $G_R$ from the gain-equalized input vector $\vec{b}_{MOD\text{-}GE}$. The gain scaler 54 may be configured to scale the real gain parameter $G_R$ based on a scaling factor $F_S$ to generate a scaled real gain parameter $G_{RS}$. According to an embodiment of the present disclosure, the scaled real gain parameter $G_{RS}$ represents an amount of leftward (e.g., a negative number) or rightward (e.g., a positive number) shift that is required to superimpose the respective one of the linearized gain errors $LG_{ERR\text{-}f1}$-$LG_{ERR\text{-}fN}$ of the selected one of the modulation frequencies $f_1$-$f_N$ onto the linearized gain error $LG_{ERR\text{-}fREF}$ of the reference modulation frequency fREF.

Based on the scaled real parameter $G_{RS}$, the gain LUT circuit 48 is able to determine a corresponding decibel gain error correction term $\Delta$Gain-dB in the reference modulation frequency $f_{REF}$. The converter circuit 56 then converts the decibel gain error correction term $\Delta$Gain-dB into the linearized gain error correction term $\Delta$Gain for the selected one of the modulation frequencies $f_1$-$f_N$.

Figure 8:
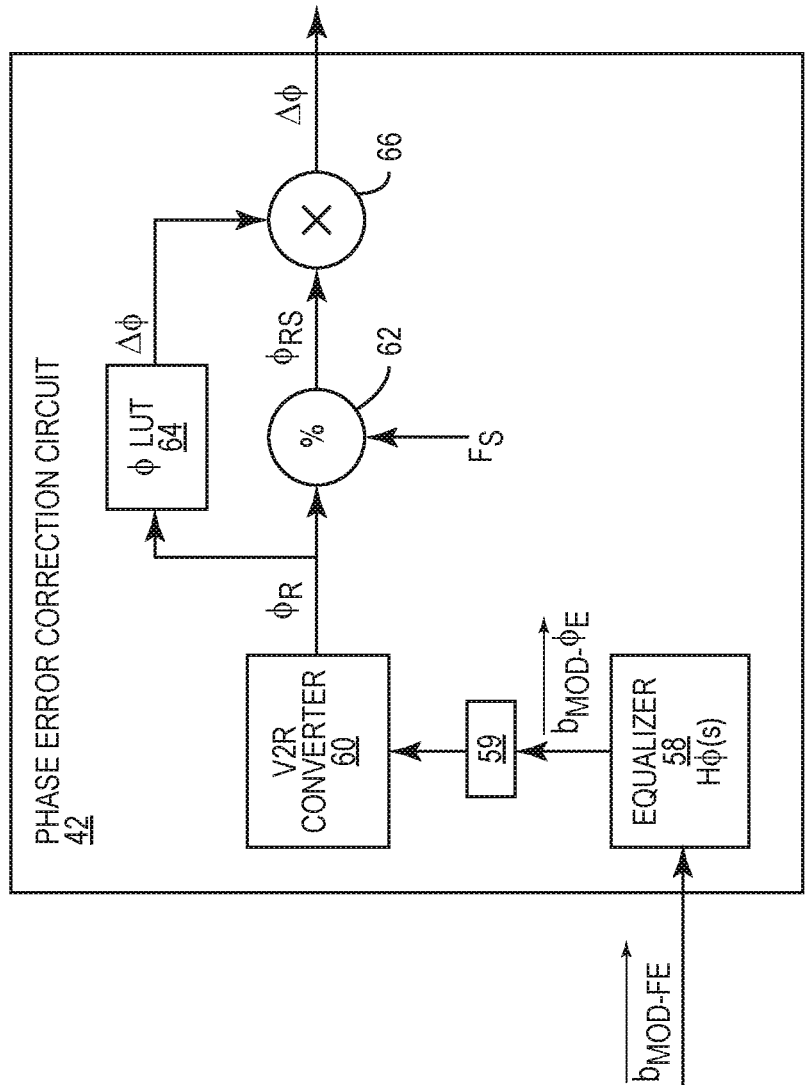
FIG. 8 is a schematic diagram of an exemplary phase error correction circuit in the transceiver circuit of FIG. 6.

FIG. 8 is a schematic diagram providing an exemplary illustration of the phase error correction circuit 42 in the transceiver circuit 34 of FIG. 6. Common elements between FIGS. 6 and 8 are shown therein with common element numbers and will not be re-described herein.

In an embodiment, the phase error correction circuit 42 includes a phase equalizer circuit 58, an amplitude calculator 59, a phase V2R converter 60, a phase scaler 62, a phase LUT 64, and a phase multiplier 66. The phase equalizer circuit 58 is configured to apply a complex phase filter $H\phi(s)$ to the frequency-equalized input vector $\vec{b}_{MOD\text{-}FE}$ to generate a phase-equalized input vector $\vec{b}_{MOD\text{-}\phi E}$ wherein the respective one of the linearized phase errors $L\phi_{ERR\text{-}f1}$-$L\phi_{ERR\text{-}fN}$ in the selected one of the modulation frequencies $f_1$-$f_N$ is superimposed onto the respective linearized phase error $L\phi_{ERR\text{-}fREF}$ in the reference modulation frequency $f_{REF}$. The amplitude calculator 59 is configured to calculate an amplitude of the phase-equalized input vector $\vec{b}_{MOD\text{-}\phi E}$.

The phase V2R converter 60 is configured to extract a real phase parameter OR from the phase-equalized input vector $\vec{b}_{MOD\text{-}\phi E}$. The phase scaler 62 is configured to scale the real phase parameter OR to generate a scaled real phase parameter $\phi_{RS}$. The phase LUT circuit 64 is configured to determine the linearized gain error correction term $\Delta\phi$ in the reference modulation frequency fREF based on the real phase parameter OR. The phase multiplier 66 is configured to multiply the scaled real phase parameter $\phi_{RS}$ with the linearized gain error correction term $\Delta\phi$.

With reference back to FIG. 6, the amplitude-phase correction circuit 44 includes a multiplier circuit 68 and a phase shifter 70. The multiplier circuit 68 is configured to multiply the linearized gain error correction term $\Delta$Gain with the frequency-equalized input vector $\vec{b}_{MOD\text{-}FE}$ to thereby generate an amplitude-corrected input vector $\vec{b}_{AMP\text{-}CRC}$. The phase shifter 70 is configured to apply the linearized phase error correction term $\Delta\phi$ to the amplitude-corrected input vector $\vec{b}_{AMP\text{-}CRC}$ to thereby generate an amplitude-phase corrected input vector $\vec{b}_{AMP\text{-}\phi\text{-}CRC}$. Subsequently, the modulation circuit 46 can convert the amplitude-phase corrected input vector $\overrightarrow{b_{AMP-\phi-CRC}}$ into an RF signal 72 and modulate the RF signal 72 onto an intermediate frequency (IF) or a carrier frequency.

The transceiver circuit 34 may include an mDPD circuit 74. In an embodiment, the mDPD circuit 74 can be configured to correct any residual gain error in the gain-equalized input vector $\overrightarrow{b_{MOD-GE}}$ (as shown in FIG. 7). The transceiver circuit 34 may also include a delay circuit 76, which can be configured to delay the frequency-equalized input vector $\overrightarrow{b_{MOD-FE}}$ to compensate for a group delay associated with the gain error correction circuit 40 and/or the phase error correction circuit 42.

The transceiver circuit 34 further includes an envelope detection circuit 78 and a target voltage circuit 80. The envelope detection circuit 78 is configured to detect a time-variant amplitude envelope $\sqrt{I^2+Q^2}$ of the input vector $\overrightarrow{b_{MOD}}$, wherein "I" and "Q" represent an in-phase component and a quadrature component of the input vector $\overrightarrow{b_{MOD}}$, respectively. The target voltage circuit 80 is configured to generate a time-variant target voltage VTGT that keeps track of the time-variant amplitude envelope $\sqrt{I^2+Q^2}$ of the input vector $\overrightarrow{b_{MOD}}$.

Figure 9:
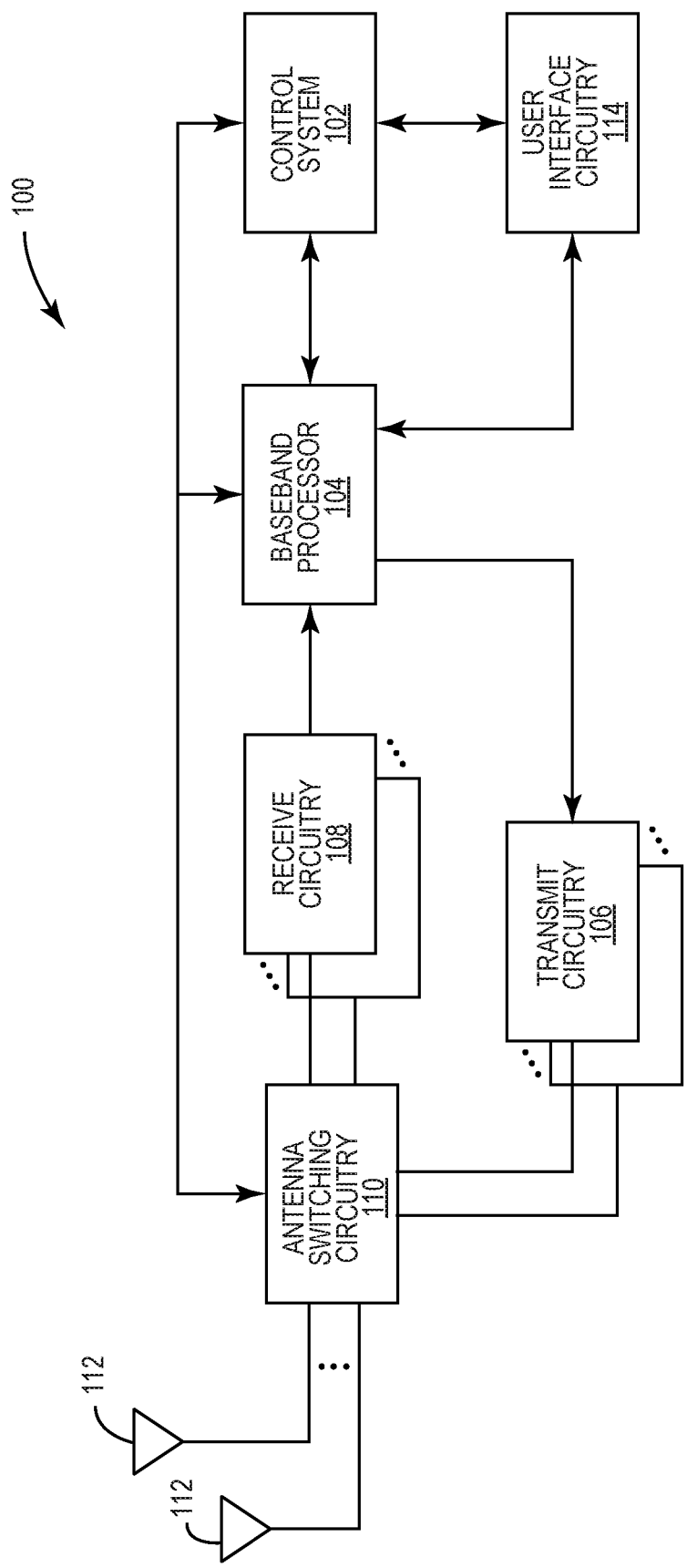
FIG. 9 is a schematic diagram of an exemplary user element wherein the transceiver circuit of FIG. 6 can be provided.

The transceiver circuit 34 of FIG. 6 can be provided in a user element (a.k.a. wireless device) to support the embodiments described above. In this regard, FIG. 9 is a schematic diagram of an exemplary user element 100 wherein the transceiver circuit 34 of FIG. 6 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

In an embodiment, the user equipment 100 of FIG. 9 can be configured to correct amplitude and phase errors according to a process. In this regard, FIG. 10 is a flowchart of an exemplary process 200 for correcting amplitude and phase errors in a wireless communication circuit, such as the user element 100 of FIG. 9.

Herein, the process 200 includes applying the frequency equalization filter $H_{FEQ}(S)$ to the input vector $\overrightarrow{b_{MOD}}$ to thereby generate the frequency-equalized input vector $\overrightarrow{b_{MOD-FE}}$ having the respective linearized gain error and the respective linearized phase error in each of the modulation frequencies $f_1$-$f_N$ (step 202). The process 200 also includes determining the linearized gain error correction term $\Delta$Gain in the selected modulation frequency $f_{TGT}$ among the modulation frequencies $f_1$-$f_N$ based on the respective linearized gain error $LG_{ERR-fREF}$ in the reference modulation frequency $f_{REF}$ among the modulation frequencies $f_1$-$f_N$ (step 204). The process 200 also includes determining the linearized phase error correction term $\Delta\phi$ in the selected modulation frequency $f_{TGT}$ based on the respective linearized phase error $L\phi_{ERR-fREF}$ in the reference modulation frequency $f_{REF}$ (step 206). The process 200 also includes adding the linearized gain error correction term $\Delta$Gain and the linearized phase error correction term $\Delta\phi$ to the frequency-equalized input vector $\overrightarrow{b_{MOD-FE}}$ to thereby generate the amplitude-phase corrected input vector $\overrightarrow{b_{AMP-\phi-CRC}}$ in the selected modulation frequency $f_{TGT}$ (step 208).

Those skilled in the art will recognize improvements and modifications to the preferred embodiments of the present disclosure. All such improvements and modifications are considered within the scope of the concepts disclosed herein and the claims that follow.

What is claimed is:

1. A transceiver circuit comprising:
   a frequency equalization circuit configured to apply a frequency equalization filter to an input vector to thereby generate a frequency-equalized input vector having a respective linearized gain error and a respective linearized phase error in each of a plurality of modulation frequencies;
   a gain error correction circuit configured to determine a linearized gain error correction term in a selected modulation frequency among the plurality of modulation frequencies based on the respective linearized gain error in a reference modulation frequency among the plurality of modulation frequencies;
   a phase error correction circuit configured to determine a linearized phase error correction term in the selected modulation frequency based on the respective linearized phase error in the reference modulation frequency; and an amplitude-phase correction circuit configured to add the linearized gain error correction term and the linearized phase error correction term to the frequency-equalized input vector to thereby generate an amplitude-phase corrected input vector in the selected modulation frequency.

2. The transceiver circuit of claim 1, wherein the gain error correction circuit is further configured to:
apply a complex gain filter to the frequency-equalized input vector to superimpose the respective linearized gain error in the selected modulation frequency onto the respective linearized gain error in the reference modulation frequency; and
determine the linearized gain error correction term in the selected modulation frequency based on the respective linearized gain error in the reference modulation frequency.

3. The transceiver circuit of claim 2, wherein the gain error correction circuit comprises:
a gain equalizer circuit configured to apply the complex gain filter to the frequency-equalized input vector to superimpose the respective linearized gain error in the selected modulation frequency onto the respective linearized gain error in the reference modulation frequency to thereby generate a gain-equalized input vector;
a gain vector-to-real (V2R) converter configured to extract a real gain parameter from the gain-equalized input vector;
a gain scaler configured to scale the real gain parameter to generate a scaled real gain parameter;
a gain lookup table (LUT) circuit configured to determine a decibel gain error correction term in the reference modulation frequency based on the scaled real gain parameter; and
a converter circuit configured to convert the decibel gain error correction term into the linearized gain error correction term.

4. The transceiver circuit of claim 1, wherein the phase error correction circuit is further configured to:
apply a complex phase filter to the frequency-equalized input vector to superimpose the respective linearized phase error in the selected modulation frequency onto the respective linearized phase error in the reference modulation frequency; and
determine the linearized phase error correction term in the selected modulation frequency based on the respective linearized phase error in the reference modulation frequency.

5. The transceiver circuit of claim 4, wherein the gain error correction circuit comprises:
a phase equalizer circuit configured to apply the complex phase filter to the frequency-equalized input vector to superimpose the respective linearized phase error in the selected modulation frequency onto the respective linearized phase error in the reference modulation frequency to thereby generate a phase-equalized input vector;
an amplitude calculator configured to calculate an amplitude of the phase-equalized input vector;
a phase vector-to-real (V2R) converter configured to extract a real phase parameter from the phase-equalized input vector;
a phase scaler configured to scale the real phase parameter to generate a scaled real phase parameter;

a phase lookup table (LUT) circuit configured to determine the linearized phase error correction term in the reference modulation frequency based on the real phase parameter; and
a phase multiplier configured to multiply the scaled real phase parameter with the linearized gain error correction term.

6. The transceiver circuit of claim 1, wherein the amplitude-phase correction circuit comprises:
a multiplier circuit configured to multiply the linearized gain error correction term with the frequency-equalized input vector to thereby generate an amplitude-corrected input vector; and
a phase shifter configured to apply the linearized phase error correction term to the amplitude-corrected input vector to thereby generate the amplitude-phase corrected input vector.

7. The transceiver circuit of claim 1, further comprising a digital baseband circuit configured to generate the input vector in the selected modulation frequency.

8. The transceiver circuit of claim 1, further comprising a modulation circuit configured to convert the amplitude-phase corrected input vector into a radio frequency (RF) signal and modulate the RF signal onto an intermediate frequency or a carrier frequency.

9. The transceiver circuit of claim 1, further comprising a memory digital predistortion (mDPD) circuit configured to correct a residual gain error in the frequency-equalized input vector.

10. The transceiver circuit of claim 1, further comprising a delay circuit configured to delay the frequency-equalized input vector to compensate for a group delay associated with the gain error correction circuit and/or the phase error correction circuit.

11. The transceiver circuit of claim 1, wherein the reference modulation frequency is a center modulation frequency among the plurality of modulation frequencies.

12. A wireless device comprising a transceiver circuit comprising:
a frequency equalization circuit configured to apply a frequency equalization filter to an input vector to thereby generate a frequency-equalized input vector having a respective linearized gain error and a respective linearized phase error in each of a plurality of modulation frequencies;
a gain error correction circuit configured to determine a linearized gain error correction term in a selected modulation frequency among the plurality of modulation frequencies based on the respective linearized gain error in a reference modulation frequency among the plurality of modulation frequencies;
a phase error correction circuit configured to determine a linearized phase error correction term in the selected modulation frequency based on the respective linearized phase error in the reference modulation frequency; and
an amplitude-phase correction circuit configured to add the linearized gain error correction term and the linearized phase error correction term to the frequency-equalized input vector to thereby generate an amplitude-phase corrected input vector in the selected modulation frequency.

13. The wireless device of claim 12, wherein the gain error correction circuit is further configured to:
apply a complex gain filter to the frequency-equalized input vector to superimpose the respective linearized gain error in the selected modulation frequency onto the respective linearized gain error in the reference modulation frequency; and determine the linearized gain error correction term in the selected modulation frequency based on the respective linearized gain error in the reference modulation frequency.

14. The wireless device of claim 13, wherein the gain error correction circuit comprises:

a gain equalizer circuit configured to apply the complex gain filter to the frequency-equalized input vector to superimpose the respective linearized gain error in the selected modulation frequency onto the respective linearized gain error in the reference modulation frequency to thereby generate a gain-equalized input vector;

a gain vector-to-real (V2R) converter configured to extract a real gain parameter from the gain-equalized input vector;

a gain scaler configured to scale the real gain parameter to generate a scaled real gain parameter;

a gain lookup table (LUT) circuit configured to determine a decibel gain error correction term in the reference modulation frequency based on the scaled real gain parameter; and a converter circuit configured to convert the decibel gain error correction term into the linearized gain error correction term.

15. The wireless device of claim 12, wherein the phase error correction circuit is further configured to:

apply a complex phase filter to the frequency-equalized input vector to superimpose the respective linearized phase error in the selected modulation frequency onto the respective linearized phase error in the reference modulation frequency; and determine the linearized phase error correction term in the selected modulation frequency based on the respective linearized phase error in the reference modulation frequency.

16. The wireless device of claim 15, wherein the gain error correction circuit comprises:

a phase equalizer circuit configured to apply the complex phase filter to the frequency-equalized input vector to superimpose the respective linearized phase error in the selected modulation frequency onto the respective linearized phase error in the reference modulation frequency to thereby generate a phase-equalized input vector;

an amplitude calculator configured to calculate an amplitude of the phase-equalized input vector;

a phase vector-to-real (V2R) converter configured to extract a real phase parameter from the phase-equalized input vector;

a phase scaler configured to scale the real phase parameter to generate a scaled real phase parameter;

a phase lookup table (LUT) circuit configured to determine the linearized phase error correction term in the reference modulation frequency based on the real phase parameter; and a phase multiplier configured to multiply the scaled real phase parameter with the linearized gain error correction term.

17. The wireless device of claim 12, wherein the amplitude-phase correction circuit comprises:

a multiplier circuit configured to multiply the linearized gain error correction term with the frequency-equalized input vector to thereby generate an amplitude-corrected input vector; and a phase shifter configured to apply the linearized phase error correction term to the amplitude-corrected input vector to thereby generate the amplitude-phase corrected input vector.

18. The wireless device of claim 12, wherein the transceiver circuit further comprises:

a digital baseband circuit configured to generate the input vector in the selected modulation frequency;

a modulation circuit configured to convert the amplitude-phase corrected input vector into a radio frequency (RF) signal and modulate the RF signal onto an intermediate frequency or a carrier frequency;

a memory digital predistortion (mDPD) circuit configured to correct a residual gain error in the frequency-equalized input vector; and a delay circuit configured to delay the frequency-equalized input vector to compensate for a group delay associated with the gain error correction circuit and/or the phase error correction circuit.

19. The wireless device of claim 18, wherein the transceiver circuit further comprises:

an envelope detection circuit configured to detect a time-variant amplitude envelope of the input vector; and a target voltage circuit configured to generate a time-variant target voltage that keeps track of the time-variant amplitude envelope of the input vector.

20. A method for correcting amplitude and phase errors in a wireless communication circuit comprising:

applying a frequency equalization filter to an input vector to thereby generate a frequency-equalized input vector having a respective linearized gain error and a respective linearized phase error in each of a plurality of modulation frequencies;

determining a linearized gain error correction term in a selected modulation frequency among the plurality of modulation frequencies based on the respective linearized gain error in a reference modulation frequency among the plurality of modulation frequencies;

determining a linearized phase error correction term in the selected modulation frequency based on the respective linearized phase error in the reference modulation frequency; and adding the linearized gain error correction term and the linearized phase error correction term to the frequency-equalized input vector to thereby generate an amplitude-phase corrected input vector in the selected modulation frequency.

* * * * *

UNITED STATES PATENT AND TRADEMARK OFFICE
CERTIFICATE OF CORRECTION

| | | |
|---|---|---|
| PATENT NO. | : 12,456,957 B2 | Page 1 of 1 |
| APPLICATION NO. | : 18/394376 | |
| DATED | : October 28, 2025 | |
| INVENTOR(S) | : Nadim Khlat | |

It is certified that error appears in the above-identified patent and that said Letters Patent is hereby corrected as shown below:

In the Specification

In Column 9, at Line 24, change "($f_{REF}$ E ($f_1$ - $f_N$))" to read --($f_{REF}$ ∈ ($f_1$ - $f_N$))--

In Column 10, at Line 49, change "phase parameter OR" to read --phase parameter $\phi R$--

In Column 10, at Line 53, change "phase parameter OR" to read --phase parameter $\phi R$--

Signed and Sealed this
Ninth Day of December, 2025

John A. Squires
*Director of the United States Patent and Trademark Office*